United States Patent [19]

Price

[11] 4,263,074

[45] Apr. 21, 1981

[54] TIRE LINER AND METHOD OF PREPARATION

[75] Inventor: Donald R. Price, Lansing, Mich.

[73] Assignees: Harold H. Vischer, Brooklyn; Harold H. Vischer, Jr., Jackson; Michael L. Vischer, Jackson; Ian C. McLeod, Lansing; Charles E. Sherry, Holt, all of Mich.

[21] Appl. No.: 139,430

[22] Filed: Apr. 11, 1980

Related U.S. Application Data

[62] Division of Ser. No. 51,720, Jun. 25, 1979.

[51] Int. Cl.³ .................... B29H 13/00; B60C 19/12
[52] U.S. Cl. ................ 156/110 R; 152/195; 152/204; 152/207; 152/348; 156/123 R
[58] Field of Search ............ 152/195, 203, 204–207, 152/347, 348, 349; 156/96, 110 R, 118, 121, 123 R

[56] References Cited

U.S. PATENT DOCUMENTS

| | | | |
|---|---|---|---|
| 1,082,660 | 12/1913 | Thomson | 152/204 |
| 1,384,484 | 7/1921 | Penwell | 152/204 |
| 1,399,575 | 12/1921 | Privett | 152/204 |
| 1,632,496 | 6/1927 | Mullineaux | 152/203 |
| 1,829,483 | 10/1931 | Hibbert | 152/195 |
| 3,964,949 | 6/1976 | Kent et al. | 156/96 |
| 3,982,577 | 9/1976 | Scimeca | 152/204 |
| 4,109,695 | 8/1978 | Miyazato | 152/347 |

*Primary Examiner*—John E. Kittle
*Attorney, Agent, or Firm*—Ian C. McLeod

[57] ABSTRACT

An improved annular shaped tire liner which is adapted to fit inside of, around and in contact with a casing of a pneumatic tire and in compression by the casing and a method for preparing the tire liner is described. The liner has a thickness which provides substantial protection against penetration of the tire to the inside of the casing. The tire liner is characterized by having a section which is an annular strip of high pressure and temperature vulcanized and molded rubber, preferably of the type used for bonding to the outside of a tire casing as a tread, with ends joined by a thin section of low temperature and pressure vulcanized rubber. The low temperature and pressure vulcanized rubber is preferably derived from a vulcanizable rubber used to bond the molded rubber to a tire casing and is sometimes referred to as "cushion rubber". Preferably sheets of flexible low temperature and pressure vulcanized rubber encase the annular strip of high pressure and temperature molded rubber and strips of low temperature and pressure vulcanized rubber are provided along the sides of the first annular strip. The low temperature and pressure vulcanized rubber preferably has been vulcanized in a mold cavity which has the shape and dimensions of the inside of a tire casing and preferably a tire casing is used as the mold cavity.

13 Claims, 15 Drawing Figures

STEP 6 — POSITIONING STRIPS IN MOLD

STEP 7 — VULCANIZING STRIPS TO FORM THE LINER

FIGURE 13a

TIRE LINER AND METHOD OF PREPARATION

This is a division, of application Ser. No. 51,720, filed 1979 June 25.

BACKGROUND OF THE INVENTION

1. Field of the Invention

The present invention relates to an improved annular liner for pneumatic tires and to the method for preparation of the liner. In particular, the present invention relates to a tire liner which has an annular section of high temperature and pressure vulcanized and molded rubber, preferably prepared from a precured process retreading strip, adapted to be positioned opposite the tread and around the circumference of the inside of the casing of a tire.

2. Prior Art

Tire liners which fit inside a pneumatic tire casing adjacent to the tread area to provide puncture protection are well known to those skilled in the art. In general the tire liners are: (1) of the self-healing type which includes a material which flows into and/or cures in a puncture in a tire tread or other part of the casing and/or (2) the type that relies upon the thickness of the liner so that the object does not penetrate to the inside of the casing thereby allowing air to escape. The present invention is concerned with the type of liner which relies upon its thickness, although the self-healing components could be used with the tire liner of the present invention.

There are a number of patents showing the two types of the liners including U.S. Pat. Nos. 1,237,698; 1,390,249; 1,399,575; 1,462,117; 1,513,900; 1,683,454; 1,988,352; 2,550,773; 2,563,787; 2,802,505; 3,563,294; 3,993,114; 4,109,695 and 4,140,167 as well as Canadian Pat. No. 709,658; Belgian Pat. No. 510,001 and British Pat. No. 708,206.

One commercially available tire liner uses a foamed, flexible and elastic polymer, such as a polyurethane, to form the liner which is pre-cast in a mold to the proper shape and dimensions. The construction is similar to the liner described in Canadian Pat. No. 709,658. The problem is that the foamed liner does not provide any significant resistance to penetration by a foreign object and the liner relies only upon its thickness, rather than any inherent toughness, to prevent foreign objects from penetrating to the inside of the casing. Also such liners cause the tires to overheat and they break down under high speed operating conditions. Also the liner is not to be used with radial type tires. When the tire goes flat, the tire liner is severely damaged or destroyed.

OBJECTS

It is therefore an object of the present invention to provide a tire liner made of a very tough rubber of the kind used as tread rubber, which preferably has been molded and vulcanized at elevated temperatures and pressure as a flat strip. It is further an object of the present invention to provide a tire liner which can be used at high speeds and which has a reduced tendency to cause overheating. Further it is an object of the present invention to provide a liner which can be used in any and all size tires, whether bias, radial, tubeless or tubed. These and other objects will become increasingly apparent by reference to the following description and to the drawings.

IN THE DRAWINGS

FIGS. 7 to 13a illustrate the steps in the preferred method of the present invention.

GENERAL DESCRIPTION

The present invention relates to the method for fabricating a shaped annular tire liner of the type adapted to fit inside of, in contact with and around a casing forming a pneumatic tire, wherein the tire includes a road contacting width of annular tread supported by two spaced apart annular sidewalls each having a centrally located circular hole and an annular bead around the hole for mounting the tire on a wheel rim and with a generally U-shaped surface inside the casing and wherein the liner has a thickness which provides substantial protection against and resistance to penetration to the inside of the casing through the liner thereby reducing the frequency of flat tires which comprises: providing an elongate strip of rubber with a length and two opposing ends such that the strip will conform to the U-shaped surface around a pneumatic tire casing of a selected size with the ends together and with the strip in compression by the casing, wherein the elongate strip includes a high temperature and pressure vulcanized and molded rubber section along the length which has a width at least about two-thirds times the width of the tread; forming an annular strip from the elongate strip by joining the ends of the elongate strip together with a thin section of low temperature and pressure vulcanizable rubber material; and vulcanizing the vulcanizable material between the ends of the annular strip thereby forming the tire liner.

The present invention further relates to the preferred method for fabricating an annular shaped tire liner of the type adapted to fit inside of, in contact with and around a casing forming a pneumatic tire wherein the tire includes a road contacting width of annular tread supported by two spaced apart sidewalls each having a centrally located hole and an annular bead around the hole for mounting the tire on a wheel rim and with a generally U-shaped surface inside of the casing and wherein the liner has a thickness which provides substantial protection against and resistance to penetration to the inside of the casing through the liner thereby reducing the frequency of flat tires which comprises: providing a mold having a cavity with a configuration and a circumference conforming to the U-shaped surface of a tire casing of a selected size; providing an elongate strip of rubber with two opposing ends and with a length such that the strip will conform to the U-shaped surface around the tire casing of the selected size in compression, wherein the elongate strip includes a width of high temperature and pressure vulcanized and molded rubber as a section along the length which is at least about two-thirds times the width of the tread of the selected size tire casing; forming an annular strip from the elongate strip by joining the ends of the strip together with a thin section of a low temperature and pressure vulcanizable rubber material; positioning the annular strip in compression in the mold cavity with a conforming pressure means against the annular strip to hold the annular strip against the U-shaped surface of the mold and with a mold release material on the mold and on the pressure means; vulcanizing the vulcanizable material between the ends of the annular strip in the mold cavity thereby forming the tire liner.

The present invention also relates to the improvement in an annular shaped tire liner adapted to fit around and in contact with the inside of a casing of a pneumatic tire to reduce the frequency of flat tires wherein the casing has a generally U-shaped surface inside and wherein the tire has spaced apart annular sidewalls supporting a tread the improvement which comprises: an annular strip of rubber which conforms to the shape of the U-shaped surface of the tire casing opposite the tread in compression in the casing and wherein the elongate strip includes a high temperature and pressure molded and vulcanized rubber section along the length and has a width and a thickness which provides for substantial protection against and resistance to penetration of the inside casing by a foreign object and having at least one joint across the width of the strip; and a thin section of a low temperature and pressure vulcanized rubber material in the joint.

The present invention further relates to the improvement in a puncture resistant annular shaped tire liner adapted to fit around and in contact with the inside of a casing of a pneumatic tire for reducing the frequency of flat tires wherein the casing has a generally U-shaped surface inside and wherein the tire has spaced apart annular sidewalls supporting a tread the improvement which comprises: an annular first strip of high temperature and pressure molded and vulcanized tire tread rubber of the type used for bonding to a tire casing as a tread which conforms to the shape of the U-shaped surface of the tire casing opposite the tread in compression and which has a width and thickness which provides substantial protection against and resistance to penetration to the inside casing by a foreign object and having at least one joint across the width of the strip; annular second strips of low temperature and pressure vulcanized rubber attached to the first strip with lengths equal to the length of the first strip in the casing opposite the tread and with joints across the widths of each second strip; and a thin section of low temperature and pressure vulcanized rubber material in the joint across the width of the first strip, wherein the flexible vulcanized rubber is derived by vulcanizing a rubber material containing a vulcanizing agent and an activator and accelerator for the vulcanizing agent at between about 60° C. to 149° C. (140° F. to 300° F.).

The present invention further relates to an improved annular shaped tire liner adapted to fit inside of, in contact with and around a casing forming a pneumatic tire for reducing the frequency of flat tires, wherein the tire includes a road contacting width of annular tread supported by two spaced apart annular sidewalls each having a centrally located hole and an annular bead around the hole for mounting the tire on a wheel rim with a generally U-shaped surface inside the casing which comprises: an annular rectangular cross-sectioned first strip of high temperature and pressure molded and vulcanized tire tread rubber of the type used for retreading a tire casing with a cross-section having two opposing long sides and two short sides between the long sides and adapted to fit inside of a tire casing and to conform to the long sides to the U-shaped surface of the tire casing opposite the tread, wherein the first strip has a width across the long sides which is at least about two-thirds times the width of the tread on the tire casing to which the first strip is to be fitted and has a thickness between the short sides which provides substantial protection against and resistance to penetration of the inside of the tire casing by a foreign object; annular second strips of low temperature and pressure vulcanized rubber bonded adjacent to or at both short sides of the first strip wherein the second strip has a width which is adapted to fit around and to conform to the U-shaped surface of the casing adjacent the first strip so as to locate and position the first strip in the casing opposite the tread; and joints in a line across the widths of the first and second strips including a thin section of a low temperature and pressure vulcanized rubber material across the width of the first strip joint, wherein the tire liner is essentially U-shaped.

The key element in the tire liner of the present invention is the high pressure and temperature molded and vulcanized rubber, referred to hereinafter as "HPT rubber". HPT rubber is preferably molded and vulcanized for precured process retreading in strips between about 1.27 and 2.54 cm (0.5 to 1 inch) thick at pressures between about 300 to 2000 pounds per square inch (21 to 140.6 kilograms per square centimeter) and at temperatures above 300° F. (149° C.) which makes it very tough and suitable for precured process retreading of tires. HPT rubber can be molded at lower pressures above about 100 psi (7.0 kg per sq cm) as in conventional tire manufacture; however, this is not preferred. The tread design is molded into the strip of HPT rubber as it is vulcanized. HPT tread rubber is very resistant to penetration by foreign objects. The HPT strips can be laminated together to form thicker sections.

HPT rubber is usually a synthetic rubber of high molecular weight which can be extruded and molded because of blended oils, particularly aromatic oils. Large amounts of carbon black are used to reduce heat buildup and to increase tread wear. Synthetic rubbers or polymers used for this purpose are styrene butadiene (SBR); 1-4-polyisoprene and 4-polybutadiene. An extensive discussion of rubber chemistry in general and HPT rubber in particular appears in Kirk-Othmer Encyclopedia of Chemical Technology Volume 17 (1968) and is well known to those skilled in the art.

When the HPT rubber is formed into an elongate tread strip for precured process application to a tire casing, the strip includes a tread design and usually grooves around the road contacting side of the strip. In the tire liner of the present invention, the HPT strips preferably include a tread design which is mounted towards the U-shaped surface of the inside of the tire casing. The grooves tend to make tire HPT rubber strip easier to conform to the U-shaped inside surface of the tire casing and can aid in cooling.

The low temperature vulcanizing flexible rubber is readily available from a variety of sources and is sometimes referred to as "cushion rubber" since it is used to bond the HPT tread rubber to a tire casing. U.S. Pat. Nos. 3,951,720 and 4,046,947 show one preferred type of rubber which is used in laminating sheets, flexible side strips and at the joints between strips of HPT rubber. Usually these strips are refrigerated to prevent them from prematurely vulcanizing. The low temperature vulcanizing flexible rubber materials are referred to hereinafter as "LT" rubber and are compatible with the HPT rubber so as to provide bonding. Generally LT rubber is oil tolerant as indicated in the specifications of the above patents. In general LT rubbers include unvulcanized rubber, a vulcanizing agent, and an activator and accelerator for the agent which are vulcanizable at less than 300° F. (149° C.) and at around atmospheric pressures and higher. Also generally included are carbon, zinc oxide, oils, antioxidants and resins. The rubber and vulcanizing agent and activator can also be incorporated into one strip and the accelerator on another companion strip or the accelerator can be applied as a solution to a rubber strip having the other ingredients to provide the vulcanizable combination. All of these variations are well known to those skilled in the art.

The HPT rubber elongate strip is formed into an annular ring by the method of the present invention and has a width which is at least about two-thirds the width of a tread on a tire casing to which the liner is to be fitted. Preferably the strip has a width which is between two-thirds and two-times the tread width depending upon the in-service requirements.

Figure 1:
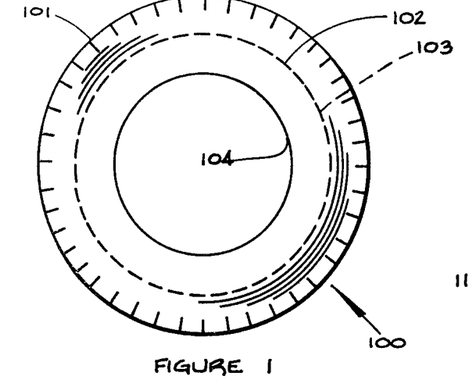
FIG. 1 is a front view of a conventional tire showing the tread and sidewalls and showing the inside of the casing in broken lines.
Figure 2:
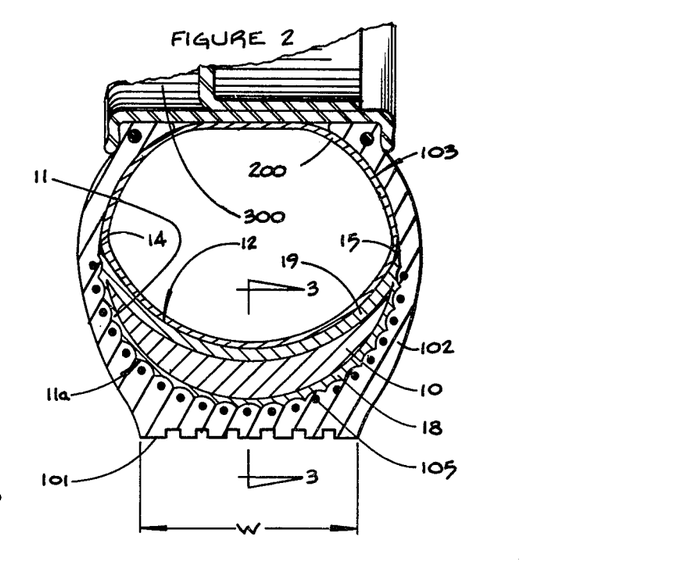
FIG. 2 is a cross-sectional view of the tire of FIG. 1 mounted on a rim with a high temperature and pressure molded and vulcanized rubber section laminated between sheets of low temperature and pressure vulcanized rubber inside the casing which has been prepared by the method of the present invention.

The phrase "in compression" as used herein means that in use the U-shaped surface of the tire casing compresses the liner, in the manner of a tight rubber band around a roll of paper, when the liner is in the tire casing. This compression tends to lock the liner onto the inside of the casing and keep it from moving in use. The HPT elongate strip is cut with a length slightly oversize in relation to the circumference of the U-shaped surface 103 inside the tire 100 as shown in FIGS. 1 and 2. The inner tube 200 also helps to keep the liner in place and under compression in use. The tire includes tread 101 and annular rim bead 104.

Figure 3:
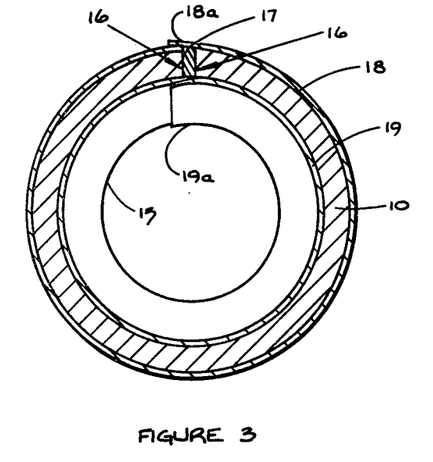
FIG. 3 is a front cross-sectional view of the liner shown in FIG. 2, particularly illustrating a joint of low temperature and pressure vulcanized rubber across the width of an annular strip of the liner and preferably with overlapping ends of the laminating sheets across the joint.

The HPT rubber can be extruded and then molded at high temperatures and pressures into an elongate strip with a U-shaped cross-section which conforms to the U-shaped inside surface 103 of the tire 100 casing such as the annular strip 10 shown in FIG. 2. Thus the liner is composed of an integral strip 10 of HPT rubber which has the preferred convex outside, concave inside cross-section including a U-shaped surface 103 contacting convex side 11 and an opposite concave side 12 and is in the form of an annulus or ring as shown in FIG. 3. The sides 11 and 12 converge to annular edges 13 and 15. Ends 16 are joined together at a joint with a thin strip 17 of rubber to form the annular or ring strip 10. The annular strip 10 is slightly oversize to be under compression when mounted in the tire 100 and this is an important element of the tire liner of the present invention. Preferably the liner 10 is encased between LT rubber sheets 18 and 19 as a laminate with overlapping portions 18a and 19a as shown in FIG. 3. When the liner is formed in a tire casing laminated between LT rubber sheets, as is preferred, the liner also tends to be locked into place by surface projections 11a produced by the tire cords 105.

Figure 4:
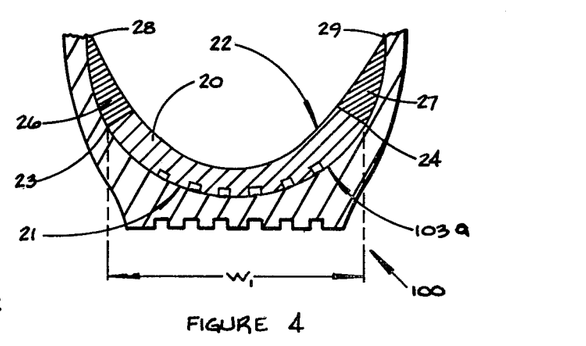
FIGS. 4 to 6 are cross-sectional views of preferred U-shaped tire liners of the present invention with partial sections of the tires particularly illustrating composite liner constructions using high temperature and pressure molded and vulcanized strips and low temperature and pressure vulcanized strips attached to each other.
Figure 5:
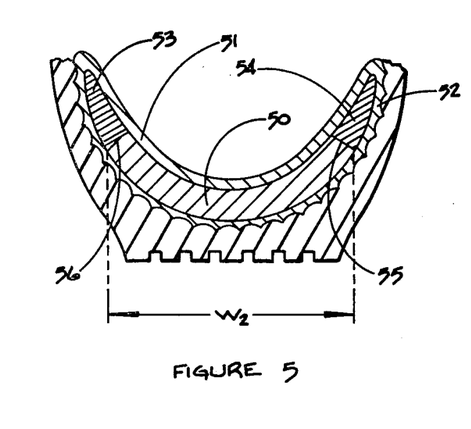
Figure 6:
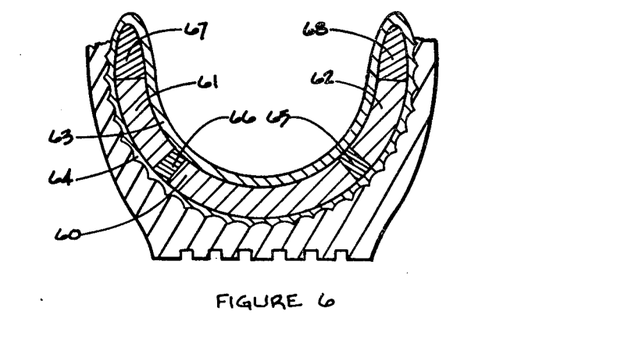
Figure 7:
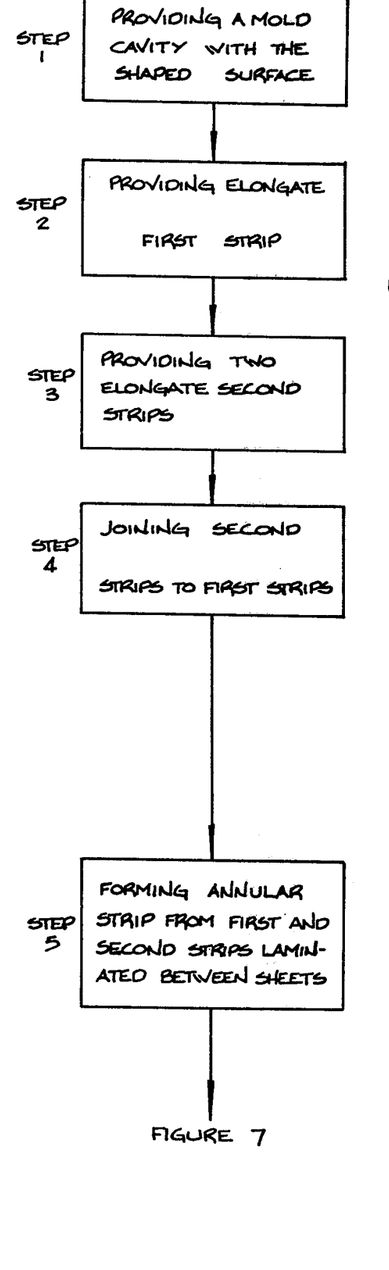
Figure 8:
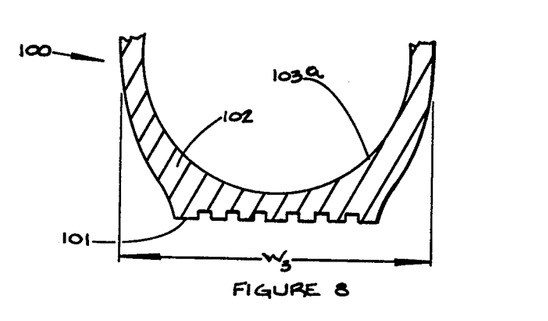
Figures 9, 10:
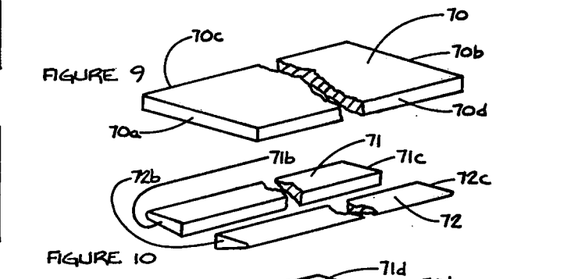

One embodiment of the tire liner of the present invention utilizes an annular strip of HPT rubber as a central core or a section of tire liner as shown in FIGS. 4 to 6. Preferably the HPT strip is rectangular in cross-section and of the type used for precured process retreading. The reason for this preference is that such a strip is readily available to many firms in the precured process tire retreading business. Many times these firms have a large inventory of these tread strips with an obsolete tread design or with an unconventional tread width. Using the method of the present invention these tread rubber stocks can be used for the tire liners of the present invention.

FIG. 4 shows a tire liner including an annular rectangular cross-sectioned HPT rubber strip 20 with a long tread side 21 and an opposite long side 22 and with annular short sides 23 and 24 between the long sides 21 and 22. The short sides 23 and 24 have LT rubber annular second strips 26 and 27 bonded to them which have a cross-section which tapers to annular edges 28 and 29. The liner conforms to the U-shaped cross-section 103 of the tire 100 as in FIG. 2. In this instance the surface 103a is shown to be relatively smooth which can occur in some of the casings, particularly passenger car tires. The width $W_1$ of the HPT rubber annular strip 20 is about equal to the width W of the tread 101 as shown in FIG. 2. The annular liner has a thin strip of LT rubber joining the ends (not shown) of the strip 20 together in the manner shown in FIG. 3.

The cross-sections of the preferred tire liners of the present invention are shown in FIGS. 5 and 6. The basic cross-section in the tire 100 casing is similar to that shown in FIG. 2. The improvement of these liners is that the HPT annular strips 50 or 60, 61 and 62 and LT rubber strips 53 and 54 or 65, 66, 67 and 68 are laminated between sheets 51 and 52 or 63 and 64 of LT rubber to provide a highly stable construction. The HPT rubber strips 50 or 60, 61 and 62 form cores and are encased and vulcanized to the sheets 51 and 52 or 63 and 64.

In FIG. 6 the HPT rubber strips 60, 61 and 62 are bonded together by thin annular sections of LT rubber 65 and 66 and second annular strips 67 and 68 of LT rubber are provided at the distal ends of the strips 61 and 62. As in the tire liners in FIGS. 2, 3 and 4, the strips 50 or the strips 60, 61 and 62 are joined together with LT rubber to form a joint (not shown) like that shown in FIG. 3.

Many other configurations of tire liner will occur to those skilled in the art. The basic element of the present invention is that the HPT annular strip is present in the liner. The casing side 11 of the liner needs to conform to the inside of the casing and the opposite side 12 has a construction which will not cut or abrade the inner tube 200. It has been found that when the HPT rubber is laminated between flexible rubber sheets 51 and 52 or 63 and 64 as in FIGS. 5 and 6, that the inner tube 200 is subject to much less wear and this construction is preferred.

SPECIFIC DESCRIPTION

In the preferred method, where a rectangular cross-section strip of tread rubber is used to form the tire liner, as shown in FIGS. 4, 5 and 6, a mold with a cavity of the selected tire size is used to provide the proper U-shaped cross-section of the finished tire liner which conforms the HPT rubber to the U-shaped surface of the inside of the tire casing. The detailed steps of the method for producing tire liners are shown in FIGS. 7 through 13a. The preferred mold is a tire casing 100 with a surface 103 or 103a as shown in FIG. 1 or 4 and as shown generally in FIG. 8 in cross-section as part of step 1 of FIG. 7. In steps 2, 3 and 4 of FIG. 7 and FIGS. 9, 10, 11 and 11a the HPT strip 70 and the LT strip 71 and 72 are cut to the proper length and joined together along the sides 70c and 70d so that at least the strip 70 will conform to the U-shaped surface 103 or 103a of the casing 100. In step 5 of FIG. 7 and FIG. 12, the ends 70a and 70b of the elongate strip 70 are joined together with LT rubber and then laminated between sheets 73 and 74 of unvulcanized LT rubber. In steps 6 and 7, the assembly is then positioned in the casing 100 with a pneumatic inner tube 200 and assembled on a split rim 301 and provided in a vulcanizing chamber (not shown). Air is provided in the tube 200 as shown in FIG. 13. In step 7 of FIG. 7, the liner is vulcanized in the mold 100. The liner in FIG. 13 extends to the full width $W_3$ of the tire 100 and the HPT rubber strip 70 is essentially the width W of the tread 100. FIG. 13a shows a narrower tire liner, wherein the HPT strip 70 covers only two-thirds of the width W of the tire tread 101 of the tire 100 as a variation of the liner shown in FIG. 13.

The following Examples 1 and 2 detail the construction of the preferred tire liner of FIG. 5 using the preferred method of FIGS. 7 to 13a. Example 1 shows the preparation of the tire liner shown in FIG. 13 adapted primarily for low speed use with a high degree of puncture protection.

EXAMPLE 1

The length and width of HPT rubber strip 70 to be used in the tire was determined as follows:

(a) The inside circumference of the U-shaped surface 103 or 103a of the tire 100 was measured using a length of masking tape adhered to the inside surface 103 opposite the tread 101.

(b) The width W of the tire at the tread 101 was measured.

(c) A length of HPT rubber strip 70 was cut so as to conform to the U-shaped surface 103 or 103a.

(d) The width of HPT rubber strip 70 was cut equal the width W of the tread.

The length of the HPT strip 70 was cut slightly longer than the inside circumference of tire (average length). The strip 70 when formed into an annulus reduces in circumference from the outside long side where the liner rests on the tire to the inside. The U-shaped surface 103 or 103a also reduces in circumference from the center of the casing to the outside edge adjacent the sidewalls 100. Therefore the average circumference was used to provide a tight fitting liner or the edge was otherwise cut to provide a good joint.

The proper length of the strip 70 was determined as follows:

(a) The tire 100 was spread with a conventional four point spreader.

(b) One end 70a of the strip 70 was centered in the middle of the U-shaped surface 103 or 103a opposite the tread 101. The strip 70 was placed inside the tire 100 until it was about half in place. If there was a tread design it was placed next to the U-shaped surface 103 or 103a.

(c) The other end of the strip 70b was inserted into the tire and butted to the first end 70a.

(d) The remainder of the strip 70 was then pushed into the tire. The strip 70 was too long for the circumference of the spread tire and had a small loop.

(e) The spreader was then released, which increased the circumference of the tire 100, and at the same time, the strip 70 was pushed into position. If the strip 70 was too short it was not tightly emplaced, and if too long the strip 70 would not go into place. The strip 70 has a U-shaped configuration which conforms to the U-shaped surface 103 or 103a of the tire 100.

Figures 11, 11A:
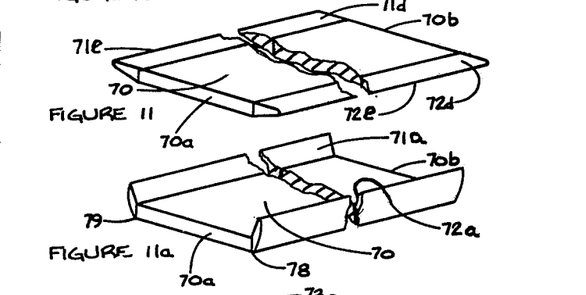

The strip 70 was taken out of the tire 100 and placed on a flat surface. The entire length was cleaned with oil-free rubber solvent. The ends 70a and 70b and sides 70c and 70d of the strip 70 were cleaned with rubber solvent and buffed with a wire wheel to make certain any mold release agents such as silicones were removed and then coated with a LT rubber cement dispersed in an organic solvent. After the cement was dry, one end 70a or 70b was covered with a layer of LT rubber (not over 1/16" or 0.158 cm) in thickness. Two strips 71 and 72 of LT rubber were cut (not under ¼" or 0.64 cm thick). The strips 71 and 72 were cut to the length of the HPT strip 70. The width was at least about 2" (5.08 cm) wide. The strips 71 and 72 were tapered adjacent where they were to be joined to the strip 70. Strips 71 and 72 were pressed together with the edge of the strip 70 so that one of the sides 71a and 72a of the strips 71 and 72 were flush with the sides 70c and 70d of the strip 70 to form a trough as shown in FIG. 11a. Rounded corners 78 and 79 of the LT rubber were cut. With a precured tread rubber strip 70, the design was facing down on the flat surface.

The joined strips 70, 71 and 72 were turned over, and the total surface was cleaned with rubber solvent and then coated with LT rubber cement and dried.

A sheet 74 of unvulcanized LT rubber was placed on the entire length of the liner (not less than 1/32" or 0.079 cm thick). The sheet was the combined length and width of strips 70, 71 and 72. The assembly was pressed together using a conventional rubber roller, referred to in the art as "stitching", along the lengths of the strips 70, 71 and 72. The assembly was turned over and a sheet 73 was stitched to the liner.

The joined strips 70, 71 and 72 were turned to their original position on the flat surface. An annulus was formed by joining the ends 70a and 70b. The ends 70a and 70b were square. The joint 75 was pressed together. A strip 73a and 74a of sheets 73 and 74 was placed over the joint 75 to protect the joint 75 from powdered release agents such as to be used in the vulcanization. Staples (not shown) were temporarily inserted across the joint 75 to hold the ends 70a and 70b together. The assembled strips 70, 71 and 72 and sheets 73 and 74 as an unvulcanized liner 77 were ready for vulcanization and were inserted into a tire casing 100.

The unvulcanized assembly 77 was folded together and folded again to reduce the diameter in order to place it in the tire 100. The tire 100, which was of a size used originally to determine the length of the strip, was spread on a four point spreader and a release agent such as soapstone was painted on the U-shaped surface 103 or 103a. The spreader was released and the assembly 77 was pressed into position as the tire 100 circumference increased. The assembly 77 was centered in the tire 100. An inner tube 200 of the proper size for the tire with the assembly 77 was painted with soapstone, with talcum powder or another release agent such as a plastic film.

The tube 200 was placed in the tire and mounted on a precured process tire retreading rim 301.

The assembly was vulcanized in a chamber with the tube aired to 120 psig (8.4 kg/sq cm) and the chamber aired to 85 psig (6.0 kg/sq cm) using heated air of kind used for the precured process retreading of tires at 85.0° C. to 98.9° C. (185° to 210° F.) until the liner 80 vulcanized and then it was removed from the tire 100 or it was used directly in the tire 100 casing. The staples in the strip 70 between the ends 70a and 70b were generally removed. Alternatively the sheet 73 can be allowed to bond to the U-shaped surface 103 or 103a of the tire 100.

The liner reduces flat tires, for almost any size tires or ply rating, due to nails, wire, steel, chips etc. The liner 80 of Example 1 can be used for limited high speed travel and at slower speeds.

Some of the uses for the liner of Example 1 are farm tires, golf carts, grass cutting tires, construction tires of every size, garbage, mining and lumber trucks and the like. The liner 80 is made as thick or thin as necessary. A tread 101 design with grooves around the tire 100 has a significant advantage because the air in the tread provides a means of cooling the tire 100. Precured tread rubber is also well balanced and therefore the tire with a liner 80 installed is as well balanced as the tire 100 was without the liner 80.

For higher speed tires up to 60 miles per hour (96 kilometers per hour), a lower degree of puncture protection is desirable. To prevent heat buildup the strip 70 should cover only two-thirds of the width W of the tire tread 101. The flexible strips 71d and 72d locate the strip 70. This liner is particularly suitable for radial tires with a tube and is shown in FIG. 13a.

EXAMPLE 2

Using the method of Example 1, a strip 70 of HPT rubber, preferably tread rubber, was cut to a width of two-thirds the width W of the tread of the tire 100 size that the liner was being made for.

The average cirumference of the U-shaped surface 103 of the tire was measured for the liner as in Example 1. The length of the HPT strip 70 was cut slightly larger than the inside circumference of the tire 100 so that it conformed to the U-shaped inside surface 103 or 103a of the casing 101.

The HPT strip 70 was placed on a flat surface. The edges 70c and 70d and ends 70a and 70b of the HPT strip 70 were cleaned, buffed with a wire wheel and then cemented with LT rubber cement.

LT rubber strips 71d and 72d were butt joined to the edges 70c and 70d of the precured rubber and pressed into place. The LT strips 71 and 72 tapered to edges 71e and 72e away from the edges 70c and 70d of the strip 70 as shown in FIG. 11.

The width of LT strips 71d and 72d together was preferably not any wider than one-third of the width W of the tread area of the tire so that the total width of the strip 70 and strips 71d and 72d was equal to the tread width W.

The strips 70, 71d and 72d were cleaned with rubber solvent and then coated with LT rubber cement. Sheets 73 and 74 of uncured rubber (not greater than 1/32"; 0.079 cm thick) were placed over the entire surfaces of the strips 70, 71d and 72d. The ends of precured rubber were cleaned and then cemented and 1/32 nd inch (0.08 cm) cushion was placed at one end 70a or 70b of the strip 70 and pressed into place to form the joint 75.

Figure 12:
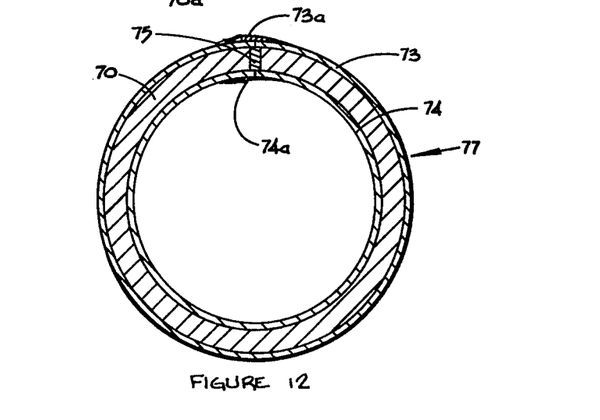
Figure 13:
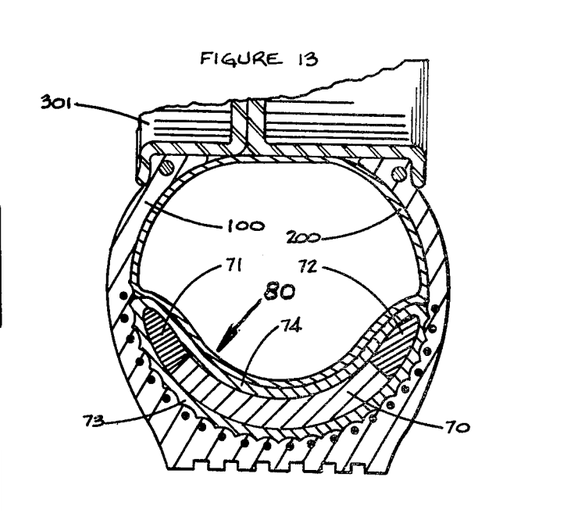
Figure 13A:
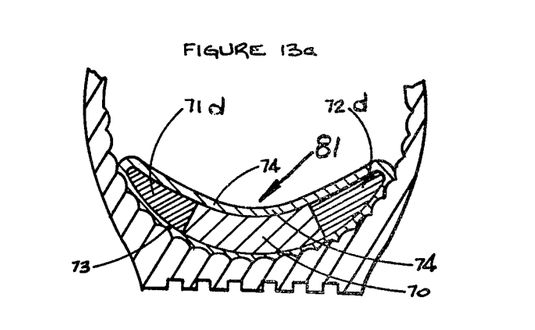

One end 70a of joined strips 70, 71d and 72d was connected to the other end 70b, again making an annular unvulcanized assembly 77 as shown in FIG. 12. The ends 70a and 70b were joined with staples (not shown) making sure they were even and tight.

The diameter of the unvulcanized assembly 77 was reduced by folding twice. A tire 100 the same size as the uncured assembly 77 was used as a mold and as four point spreader (not shown) was used to spread tire 100 and insert the uncured assembly 77. The uncured assembly 77 was covered with plastic or powder to keep it from vulcanizing to the inner tube 200. The assembly 77 was centered in the tire 100. The spreader was released and at the same time the assembly 77 was pushed into place. An inner tube 200 was inserted into the tire 100, and mounted on a curing rim 301 of the type used for precured process tire retreading, and placed in a pressure chamber for curing. The tire 100 was cured to 120 psig (8.4 kg/sq cm) and the tire was aired to 85 psig (6.0 kg/sq cm) and placed in a heat chamber (not shown) and cured at 190 to 210° F. (87.8 to 98.9° C.). The liner 81 as shown in FIG. 13a was removed from the tire and the staples were removed, and the liner 81 was ready for use.

EXAMPLE 3

The procedure of Example 1 was repeated except that an old tire casing was used to fabricate the HPT rubber strip 70. The liner was to be for low speed use and was thus like liner 80.

An old tire casing (the size is dependent upon the width and thickness needed for the liner), was first cut to the width needed. The casing was cut on either side of the tread, preferably at a 10° to 30° angle from the tread surface of the tire, through the ply or fabric toward the center of the casing to form the sides 70c and 70b. Band saws or the like can be used for this purpose. The casing was cut to form the strip 70 with the length needed for the selected size of tire. To determine the length of the strip 70, the same masking tape measuring method as used for precured rubber in Example 1 was used. The strip 70 was placed on a flat table with the tread design facing down. The strip 70 was cleaned with rubber solvent and cemented with low temperature curing cement. Both sides 70c and 70d, ends 70a and 70b, and fabric side opposite the tread design were cemented. The cement was dried and the entire surface cemented again and dried. Special care was used to make sure that the tire fabric on the cut sides 70c and 70d had sufficient cement. The first coat of cement was absorbed into the fabric and a second coat was needed to give good contact and bond with the LT strips 71 and 72. The first coat of cement cures in the cord fabric and assured a good bond. Two LT rubber strips 71 and 72 were cut to the length of the HPT strip 70 and to the width desired (not less than 1" or 2.54 cm). The LT uncured rubber strips 71 and 72 were attached to the HPT strip. A sheet 74 of uncured LT rubber was cut to the length of the strip 70 and the combined widths of strips 70, 71, and 72. The LT sheet 74 was laminated to the surface.

The assembly 77 was turned over. Two pieces of uncured LT rubber sheet 73 (1/32" thick) were cut to slightly over the length of the strip 70 and the combined widths of strips 70, 71, and 72. The sheet 73 was laminated to strips 70, 71 and 72. The annulus was formed by joining the ends 70a, 71b, 72b and 70b, 71c and 72c together and the liner was formed by vulcanization as in Example 1.

Utilizing old tire casings producing liners by substituting tire casings for precured tread rubber is a sound and efficient means of converting a useless, hard to dispose of tire casing into a useful product.

When a tube is inserted in a tire with a liner, mounted on a rim and aired, the liner is forced up against the tire, between the tire and tube. In order for an object to cause the tire to go flat, the object must penetrate both the tire and the liner. Most flats occur within the tread area of a tire; therefore the main area of protection is at least at the center two-thirds of the tread width of the tire.

The liner of Example 1 protects the sidewalls as well but at sustained higher speeds (over 60 mph; 96 kph) tends to overheat. The flex area of the tire sidewalls is not covered by the liner of Example 2 in order to keep the tire running as cool as possible.

When the tire liner is formed and removed from the mold, it is not necessary that the projections 11a mate with projections from the tire cords 105 if they are present. In any event, the projections 11a do not interfere with the usefulness of the liner.

I claim:

1. The method for fabricating a shaped annular tire liner of the type adapted to fit inside of, in contact with and around a casing forming a pneumatic tire, wherein the tire includes a road contacting width of annular tread supported by two spaced apart annular sidewalls each having a centrally located circular hole and an annular bead around the hole for mounting the tire on a wheel rim and with a generally U-shaped surface inside the casing and wherein the liner has a thickness which provides substantial protection against and resistance to penetration to the inside of the casing through the liner thereby reducing the frequency of flat tires which comprises:

(a) providing an elongate strip of rubber with a length and two opposing ends such that the strip will conform to the U-shaped surface around a pneumatic tire casing of a selected size with the ends together and with the strip in compression by the casing, wherein the elongate strip includes a high temperature and pressure vulcanized and molded rubber section along the length which has a width defined by two long sides which is at least about two-thirds times the width of the tread and includes a low temperature and pressure vulcanizable rubber bonded along at least the sides of the vulcanized and molded rubber section;

(b) forming an annular strip from the elongate strip by joining the ends of the elongate strip together with a thin section of low temperature and pressure vulcanizable rubber material; and (c) vulcanizing the vulcanizable material between the ends and along the sides of the annular strip thereby forming the tire liner.

2. The method for fabricating an annular shaped tire liner of the type adapted to fit inside of, in contact with and around a casing forming a pneumatic tire, wherein the tire includes a road contacting width of annular tread supported by two spaced apart sidewalls each having a centrally located hole and an annular bead around the hole for mounting the tire on a wheel rim and with a generally U-shaped surface inside the casing and wherein the liner has a thickness which provides substantial protection against and resistance to penetration to the inside of the casing through the liner thereby reducing the frequency of flat tires which comprises:

(a) providing a mold having a cavity with a configuration and a circumference conforming to the U-shaped surface of a tire casing of a selected size;

(b) providing an elongate strip of rubber with two opposing ends and with a length such that the strip will conform to the U-shaped surface around the tire casing of the selected size in compression, wherein the elongate strip includes a width defined by two long sides of a high temperature and pressure vulcanized and molded rubber as a section along the length which is at least about two-thirds times the width of the tread of the selected size tire casing and includes a low temperature and pressure vulcanizable rubber bonded along at least the sides of the vulcanized and molded rubber section;

(c) forming an annular strip from the elongate strip by joining the ends of the strip together with a thin section of a low temperature and pressure vulcanizable rubber material;

(d) positioning the annular strip in compression in the mold cavity with a conforming pressure means against the annular strip to hold the annular strip against the U-shaped surface of the mold and with a mold release material on the mold and on the pressure means; and (e) vulcanizing the vulcanizable material between the ends and along the sides of the annular strip in the mold cavity thereby forming the tire liner.

3. The method for fabricating an annular shaped tire liner of the type adapted to fit inside of, in contact with and around a casing forming pneumatic tire wherein the tire includes a road contacting width of annular tread supported by two spaced apart sidewalls each having a centrally located hole and an annular bead around the hole for mounting the tire on a wheel rim and with a generally U-shaped surface inside the casing and wherein the liner has a thickness which provides substantial protection against and resistance to penetration to the inside of the casing through the liner thereby reducing the frequency of flat tires which comprises:

(a) providing a mold having a cavity with a configuration and a circumference conforming to the U-shaped surface of a tire casing of a selected size;

(b) providing a rectangular cross-sectioned elongate first strip of a high temperature and pressure vulcanized and molded rubber which has a length and two opposing ends of the length such that the first strip will conform to the U-shaped surface around the tire casing of the selected size in compression and has a width formed by two long sides along the length which is at least about two-thirds times the width of the tread of the selected tire casing and a thickness defined by two short sides;

(c) providing two elongate second strips of unvulcanized low temperature and pressure vulcanizing rubber each with a length, two opposing ends of each length and a width such that the second strips fit the U-shaped surface of the casing;

(d) joining the lengths of the elongate second strips near or at the short sides and along the length of the first strip with a low temperature and pressure vulcanizable rubber cement containing a vulcanizing agent and an activator and an accelerator for the agent;

(e) forming an annular strip by joining the ends of the elongate strips together with a low temperature and pressure vulcanizable rubber material including a vulcanizing agent and an activator and an accelerator for the agent between the ends of the first strip to form a joint;

(f) positioning the annular strip in compression in the mold cavity with a conforming pressure means against the annular strip to hold the annular strip against the mold and with a mold release material on the mold and on the pressure means; and (g) vulcanizing the vulcanizing rubber to the first strip in the mold and thereby forming the tire liner, wherein the tire liner is essentially U-shaped.

4. The method of claim 3 wherein the mold is a tire casing of the selected size.

5. The method of claim 3 wherein the pressure means is a gas inflated pneumatic inner tube which fits into the mold cavity.

6. The method of claim 3 wherein vulcanizing is at temperatures between about 60° C. and 149° C.

7. The method of claim 3 wherein the first and second annular strips are laminated between sheets of unvulcanized flexible rubber and wherein all of the unvulcanized rubber is vulcanized at temperatures between about 60° C. and 149° C.

8. The method of claim 3 wherein the first elongate strip has a molded tread design and is of the type adapted for retreading the outside of a tire casing and wherein the tread design is positioned to face the mold cavity.

9. The method of claim 8 wherein the tread design of the first strip includes a series of molded grooves along the length.

10. The method of claim 3 wherein the first strip has been extruded and then molded and vulcanized at pressures of between about 21 to 70.3 kg per square cm and at temperatures above about 149° C.

11. The method of claim 3 wherein the second strips are vulcanized to the first strip at temperatures between about 60° C. and 149° C.

12. The method of claim 3 wherein the second strips are joined to the short sides of the first strip and taper to an edge away from the first strip.

13. The method of claim 3 wherein the second strips are joined to the short sides of the first strip to form a rounded corner.

* * * * *